United States Patent [19]

Ram et al.

[11] Patent Number: 5,789,044

[45] Date of Patent: Aug. 4, 1998

[54] ZEOLITE MOLECULAR SIEVES FOR PACKAGING STRUCTURES

[75] Inventors: Arunachalam Tulsi Ram; Brett Zippel Blaisdell; Diane Marie Carroll-Yacoby, all of Rochester, N.Y.

[73] Assignee: Eastman Kodak Company, Rochester, N.Y.

[21] Appl. No.: 590,841

[22] Filed: Jan. 24, 1996

[51] Int. Cl.[6] ...................................... B65D 81/24
[52] U.S. Cl. .................. 428/35.7; 428/36.4; 428/906; 428/913; 206/204; 206/524.6; 206/389; 206/316.2; 53/402; 242/600; 242/610.6; 396/535
[58] Field of Search .................................. 428/35.7, 36.4, 428/906, 913; 206/204, 524.6, 389, 316.2; 53/402; 242/600, 610.6; 396/535

[56] References Cited

U.S. PATENT DOCUMENTS

| 3,747,223 | 7/1973 | Faulhaber . |
|---|---|---|
| 4,036,360 | 7/1977 | Deffeyes . |
| 4,852,732 | 8/1989 | Wilksi et al. . |
| 5,009,308 | 4/1991 | Cullen et al. . |
| 5,041,525 | 8/1991 | Jackson . |
| 5,189,581 | 2/1993 | Schroeder et al. . |
| 5,215,192 | 6/1993 | Ram et al. . |

FOREIGN PATENT DOCUMENTS

| 0 599 690 | 6/1994 | European Pat. Off. . |
|---|---|---|
| 1308762 | 3/1973 | United Kingdom . |
| 94/03534 | 2/1994 | WIPO . |
| 96/04189 | 2/1996 | WIPO . |

*Primary Examiner*—Charles Nold
*Attorney, Agent, or Firm*—Paul A. Leipold

[57] ABSTRACT

The invention relates to a method improving the storage qualities of a container or film holder comprising providing a container wherein at least a portion of the structure of said container comprises a molecular sieve or calcium, magnesium, or aluminum salt.

9 Claims, No Drawings

ZEOLITE MOLECULAR SIEVES FOR PACKAGING STRUCTURES

FIELD OF THE INVENTION

This invention relates to a method and article for improving the storage of materials subject to deterioration by water vapor absorption or absorption of gases such as $SO_2$ or ozone. It particularly relates to storage of photographic films.

BACKGROUND OF THE INVENTION

The ability to store processed and unprocessed photographic film without change in the properties of the film is important to maintaining exposed and developed films, as well as maintaining consistent performance of unexposed films. The archival keeping properties of photographic films are expected to be measured in decades. The properties of unexposed films are intended to remain stable over many months of storage in various conditions.

It is common practice to use hermetically sealed containers of plastic or metal, or to seal in metal coated polymer bags to prevent moisture access to films. It is also desirable to protect films from gases such as $SO_2$ and ozone. Other materials such as food also need sealed and protective packaging. This is commonly referred to as Modified Atmosphere Packaging (MAP). This is where you create a specific ambient condition within a package different than typical ambient atmospheric condition.

Further, it has been disclosed in U.S. Pat. No. 5,215,192—Ram et al that particulate materials such as molecular sieve zeolites may be placed in film storage containers for exposed films to improve their storage properties. Desiccants also have been proposed for package insert or coating material for a package for film or cameras in U.S. Pat. No. 4,036,360—Deffeyes.

It has been proposed in U.S. Pat. No. 5,189,581—Schroder that desiccants be placed within video cameras in order to dry the cameras.

However, the above systems for placing materials for drying into a package or apparatus suffer from some disadvantages. The disposal of the desiccant packs is difficult, as consumers do not know what to do with them. Further, they can become displaced or broken, interfering with the functioning of the components where humidity protection is being provided. Further, they add to cost, as there is a separate assembly step to place desiccant packs in packages, as well as the cost of making the desiccant packages.

PROBLEM TO BE SOLVED BY THE INVENTION

There remains a need for a method of providing packages and articles with improved desiccant and gas absorbing protection. Further, there is a need for a better method of providing photographic articles and packaging with desiccant protection.

SUMMARY OF THE INVENTION

An object of the invention is to overcome disadvantages of prior methods and articles.

A further object of the invention is to provide improved moisture protection for photographic articles.

An additional object is to provide improved storage qualities and container for storing photographic materials.

These and other objects of the invention generally are accomplished by providing a method of improving the storage qualities of a container comprising forming at least a portion of the structure of said container from a material that comprises a particulate molecular sieve material and polymer blend.

Another embodiment of the invention is a container wherein at least a part of the structure of the container comprises a blend of a particulate molecular sieve material and polymer. A preferred container is a film holder.

ADVANTAGEOUS EFFECT OF THE INVENTION

The invention provides packaging that provides moisture protection without the need for a separate package of desiccant which presents a disposal problem, as well as a packaging problem. The method and articles of the invention further provide an integral structure that is both a structural part of an article, as well as providing desiccant protection. The method and articles of the invention are low in cost and provide improved film properties by allowing storage of materials without deterioration.

DETAILED DESCRIPTION OF THE INVENTION

The invention has advantages in that cameras and cartridges operate under different climatic conditions with less variation because they have been formed at least partially from the desiccant materials of the invention. The inherent curl and coreset of the film inside the magazines and cartridges will be reduced. Addition of the molecular sieves of the invention also will catalytically decompose atmospheric pollutants such as $H_2O_2$, $SO_3$, and ozone, therefore, enhancing the integrity of raw and processed film. Even when moisture saturation of the molecular sieves of the invention occurs, the structural products will maintain their integrity, as well as being conductive and providing static protection to the materials. The invention also has the advantage that the reduction in moisture during storage will improve the raw stock keeping of a photographic film by increasing the glass transition temperature of the gelatin emulsion due to the reduced moisture content. The invention also has the advantage that ferrotyping/sticking/blocking of roll films under normal and adverse storage conditions will be minimized independent of the film support material. The stable storage of film also will lead to improved film actuations in cameras and cartridges. Further, lowering of humidity in storage will reduce degradation of film by reducing hydrolysis of the support which will lead to degradation of the film over long periods of storage for both raw and particularly processed films. These and other advantages will be apparent from the description below.

In the practicing of the invention, molecular sieve materials are blended with a polymer which is then formed into structural components finding their preferred use in the photographic area. The structural components of the polymer molecular sieve blend may be utilized in containers. The containers may be used for processed film, exposed but unprocessed film, or unexposed film. The structural polymer materials of the invention also may be utilized in other products that would benefit from the absorption of water vapor and atmospheric pollutants by the molecular sieves. The structural polymer materials and containers would also find use in packaging of electrical materials or dried food products.

In the storage of photographic materials, it is important that the relative humidity be maintained at a low percent of moisture content, as the gelatin which contains the image materials exhibits a variety of glass transition temperatures depending on the amount of retained moisture due to the surrounding relative humidity of the air in equilibrium as shown in Table 1.

TABLE 1

Relative Humidity, Percent Moisture Content and Glass Transition Temperature (Tg) of Gelatin Films

| Percent RH | 80 | 70 | 60 | 50 | 40 | 30 | 20 | 10 |
|---|---|---|---|---|---|---|---|---|
| Percent moisture content in gelatin emulsions | 28 | 22 | 20 | 18 | 16 | 14 | 12 | 10 |
| Glass transition temperature of gelatin, deg C. | 21 | 35 | 42 | 50 | 62 | 71 | 80 | 90 |

As shown by the above table at 80 percent relative humidity, the glass transition temperature is generally at room temperature. Even at 70 percent relative humidity, the glass transition temperature could be reached in many storage conditions such as in warehouses. Moisture absorption by the zeolites will increase the glass transition temperature of gelatin. The resulting increase of the glass transition temperature will prevent rapid deterioration of the film due to hydrolysis. Lowering of glass transition temperature by chemical other than water vapor also should be prevented.

The term "film holder" as utilized in description of this invention includes materials for the storage and holding of film materials, both in developed and undeveloped state. It includes single-use camera parts and multiple use camera parts. It further includes the use of material as a core for winding of unexposed film. It includes the use of the invention polymer blend material to form a container or part of a container for storing exposed and unexposed film (i.e., 35mm film cans, large format cartridges, aerial film cans, movie reel cans), and as a core for winding and storing exposed and processed film. It is intended to include anything in which film is enclosed.

When the term "structure" or "structural" is utilized in describing this invention, it is intended that the phrase be interpreted to include the use of the polymer molecular sieve blends as an integral portion of a film holder or other article. By an integral member, it is meant that the polymer and molecular sieve blend is not an additional member or insert that merely serves to bring the molecular sieve into the article but that the molecular sieve containing member serves a functional purpose in the forming of the film holder or other article. For instance, the blend of the invention may form a film core on which film is wound prior to being inserted into the film cartridge, cassette, or single use camera. A film cassette can hold a support that records both magnetic and silver halide imaging medium. The core of the invention is the sieve containing material rather than being a core into which another polymer blend has been inserted. The structural member also may be a lid for a container or at least a part of the container itself. The "structure" language is intended to differentiate from the addition of packets of disiccant material into structural member where they are not an integral portion of the member and do not serve a structural purpose.

Any suitable desiccant may be used for the invention. Typical of suitable materials are the salts of Group II and III metals such as salts of calcium, cobalt, magnesium, and aluminum. A particularly suitable salt is $MgSO_4$. The preferred materials are molecular sieve zeolites, as they have the ability to blend well with polymers, have good desiccant properties, and absorb other gases such as $SO_2$ and absorb acids such as the acetic acid released for cellulose nitrate film base during storage.

Any suitable molecular sieve zeolite such as, for example, Type A, Type L, Type X, Type Y and mixtures of these zeolites may be used in this invention. The molecular sieve materials are crystalline, hydrated metal aluminosilicates which are either made synthetically or naturally occurring minerals. Such materials are described in U.S. Pat. Nos. 2,882,243, 2882,244, 3,078,636, 3,140,235 and 4,094,652, all of which are incorporated herein by reference. In the practice of this invention the two types, A and X, are preferred. Molecular sieve, zeolites contain in each crystal interconnecting cavities of uniform size, separated by narrower openings, or pores, of equal uniformity. When formed, this crystalline network is full of water, but with moderate heating, the moisture can be driven from the cavities without changing the crystalline structure. This leaves the cavities with their combined surface area and pore volume available for absorption of water or other materials. The process of evacuation and refilling the cavities may be repeated indefinitely under favorable conditions.

With molecular sieves, close process control is possible because the pores of the crystalline network are uniform rather than of varied dimensions, as is the case with other adsorbents. With the large surface area and pore volume, molecular sieves can make separations of molecules, utilizing pore uniformity, to differentiate on the basis of molecular size and configuration.

Molecular sieves are crystalline, metal aluminosilicates with three dimensional network structures of silica and alumina tetrahedra. This very uniform crystalline structure imparts to the molecular sieves properties which make them excellent desiccants, with a high capacity even at elevated temperatures. The tetrahedra are formed by four oxygen atoms surrounding a silicon or aluminum atom. Each oxygen has two negative charges and each silicon has four positive charges. This structure permits a sharing arrangement, building tetrahedra uniformly in four directions. The trivalency of aluminum causes the alumina tetrahedron to be negatively charged, requiring an additional cation to balance the system. Thus, the final structure has sodium, potassium, calcium or other cations in the network. These charge balancing cations are the exchangeable ions of the zeolite structure.

In the crystalline structure, up to half of the quadrivalent silicon atoms can be replaced by trivalent aluminum atoms. Zeolites containing different ratios of silicon to aluminum ions are available, as well as different crystal structures containing various cations.

In the most common commercial zeolite, Type A, the tetrahedra are grouped to form a truncated octahedron with a silica or alumina tetrahedron at each point. This structure is known as sodalite cage.

When sodalite cages are stacked in simple cubic forms, the result is a network of cavities approximately 11.5 Å in size, accessible through openings on all six sides. These openings are surrounded by eight oxygen ions. One or more exchangeable cations also partially block the face area. In the sodium form, this ring of oxygen ions provides an opening of 4.2 Å in diameter into the interior of the structure. This crystalline structure is represented chemically by the following formula:

$$Na_{12}[(AlO_2)_{12}(SiO_2)_{12}]\cdot xH_2O$$

The water of hydration which fills the cavities during crystallization is loosely bound and can be removed by moderate heating. The voids formerly occupied by this water can be refilled by adsorbing a variety of gases and liquids. The number of water molecules in the structure (the value of X) can be as great as 27.

The sodium ions, which are associated with the aluminum tetrahedra, tend to block the openings, or conversely may assist the passage of slightly oversized molecules by their electrical charge. As a result, this sodium form of the molecular sieve, which is commercially called 4 A, can be regarded as having uniform openings of approximately 4 Å diameter.

Because of their base exchange properties, zeolites can be readily produced with other metals substituting for a portion of the sodium.

Among the synthetic zeolites, two modifications have been found particularly useful in industry. By replacing a large fraction of the sodium with potassium ions, the 3 A molecular sieve is formed (with openings of about 3 Å). Similarly, when calcium ions are used for exchange, the 5 A (with approximately 5 Å openings) is formed.

The crystal structure of the Type X zeolite is built up by arranging the basic sodalite cages in a tetrahedral stacking (diamond structure) with bridging across the six-membered oxygen atom ring. These rings provide opening 9–10 Å in diameter into the interior of the structure. The overall electrical charge is balanced by positively charged cation(s), as in the Type A structure. The chemical formula that represents the unit cell of Type X molecular sieve in the soda form is shown below:

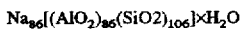

$$Na_{86}[(AlO_2)_{86}(SiO2)_{106}] \cdot xH_2O$$

As in the case of the Type A crystals, water of hydration can be removed by moderate heating and the voids thus created can be refilled with other liquids or gases. The value of X can be as great as 276.

A prime requisite for any adsorbent is the possession of a large surface area per unit volume. In addition, the surface must be chemically inert and available to the required adsorbate(s). From a purely theoretical point of view, the rate at which molecules may be adsorbed, other factors being equal, will depend on the rate at which they contact the surface of adsorbent particles and the speed with which they diffuse into particles after contact. One or the other of these factors may be controlling in any given situation. One way to speed the mass transfer, in either case, is to reduce the size of the adsorbent particles.

While the synthetic crystals of zeolites are relatively small, e.g., 0.1 µm to 10 µm, these smaller particles may be bonded or agglomerated into larger shapes. Typical commercial spherical particles have an average bonded particle size of 1000 µm to 5000 µm (4 to 12 mesh). Other molecular sieve shapes, such as pellets (1–3 mm diameter), Rashig rings, saddles, etc., are useful.

The molecular sieve should be employed as received from the manufacture which is in the most dry conditions. If the molecular sieve has been exposed to the atmosphere, it is preferred that it be reactivated according to manufacturer's recommendations.

The molecular sieve generally is combined into the polymer by blending with the polymer prior to its formation into an article. The polymer utilized may be a thermoplastic semicrystalline polyolefin polymer, such as polyethylene polymers, or polypropylene, an amorphous polymer such as polystyrene, butadienestyrene or polyphenylene ether or any thermosetting polymer. Also suitable are polyesters and acrylics. Preferred for the formation of spooled film cartridges are the high impact polystyrene polymers. When blended with the polymer which forms parts of a camera, generally the resin is high impact polystyrene. High impact polystyrene (HIPS) generally is rubber modified with a rubber content of 5 to 12 weight percent. The containers for film cartridges generally are high or low density polyethylene.

The molecular zeolite generally is in powder form when incorporated into the polymer. However, there might be instances when a molecular sieve may be somewhat larger than powder such as pellets, although materials incorporating larger particles of the molecular sieve material are not as strong and not suitable for more demanding structural applications. The polymer and zeolite blends can be recycled in the same way as pure polymer film holder parts.

The molecular sieve material may be incorporated in any suitable amount. Generally when the molecular sieve zeolite of a particle size of between 0.1 and 10 micrometers average diameter is utilized, the material can be present in any effective amount up to about 30 percent by weight of the blend of polymer and zeolite and still provide adequate structural properties for use in most photographic packaging and structural camera parts. A suitable amount of molecular sieve material is between 2 and 40 weight percent of the total weight of the blend on polymer and molecular sieve. The amount can be varied depending on the mechanical requirement of the structural member. A preferred amount of incorporation is between about 2 and 15 percent by weight of the powder for good absorption of water vapor and other vapors with preservation of the properties of the high density polyethylene and high impact polystyrene utilized in formation of photographic articles such as cores for winding film, cameras, and storage containers.

The method for formation of the articles may be any compounding process. Typical polymer forming compounding methods such as two roll mixer, high intensity blade, mixers, continuous in line static mixer, and single screw extrusion may be used. Preferred for the process has been found to be the twin screw extruder. It is also possible to incorporate with humidity indicators with the extrusion and mixing process. Such materials include anhydrous Cobalt (II) salts. Forming methods include web formation. Preferred for film holder parts is injection molding.

The cartridges, containers, and camera parts at least partially formed of the molecular sieves of the invention must be stored and kept dry until use. Generally if the materials are used to form containers for storage of film or camera parts, particularly cores for winding film after the loading of the single use camera or placement of the film in the container, the packages are sealed such that moisture will not be present until the package is opened for use. Therefore, the molecular sieves will be quite effective in maintaining absorption of any water vapor which makes it by the typical barrier seals for film packaging and storage. However, precaution is needed to protect the plastic molded cores, cartridges, canisters containing the zeolite, or any other desiccant material from high humidity exposure prior to the time when the article is loaded with film.

While the above description has dealt primarily with use of the molecular sieve polymer blend materials for storage of film, they also would find use in other areas, particularly in the packaging where they would provide desiccant and noxious gas protection for the modified atmospheric packaged materials during shipping. It is contemplated that this method and structural materials could be utilized for shipping of electrical components, medical or food products where high humidity conditions are not desirable. The invention would also find use in the packaging for optical disks and audio tapes. The cores for audio tapes or optical disks also could be formed from the structural materials of the invention. The packaging and storage containers for other information storage media such as information storage disks also could be formed from the structural members of the invention. Magnetic, as well as photographic media, are subject to degradation caused by the presence of nitrous gases and water vapor in the atmosphere to which they are subject. All of them would benefit by being in proximity to the structural members such as formed by this invention. The inserts of the invention have been described for use with photographic products. However, the inserts would find use in other packaging areas such as for food, electronic items, magnetic storage media optical disks, and medical products where the ability to absorb water vapor and noxious gases would be advantageous.

The following examples illustrate the practice of this invention. They are not intended to be exhaustive of all possible variations of the invention. Parts and percentages are by weight unless otherwise indicated.

EXAMPLES

A Molecular Sieve Type 4A zeolite was obtained from UOP—Molecular Sieve Division, Inc. The zeolite has a chemical composition of sodium aluminosilicate and has an average particle size of about 5 microns. The molecular sieve was compounded into high impact polystyrene (HIPS) and a high density polyethylene copolymer (HDPE) using a 0.812 Counter-rotating Twin-screw Compounding extruder. Two batches were formed—Batch A, a 20 percent sieve content masterbatch in HIPS and a 30 percent sieve content masterbatch in HDPE. The material was then let down with unblended HIPS and HDPE and molded into ASTM test specimens. The test specimens were tested by ASTM method D638 The results of the testing are reported in Table 2.

TABLE 3

Effect of Molecular Sieve Additive on Impact Strength

| Base Resin | % Molecular Sieve Powder | Impact Strength Value | |
|---|---|---|---|
| | | Max Load (kgf) | Energy (joule) |
| HDPE | 0 | 66.68 | 2.60 |
| HDPE | 5 | 60.78 | 1.94 |
| HDPE | 10 | 58.97 | 1.71 |
| HDPE | 20 | 57.61 | 1.56 |
| HDPE | 30 | 55.34 | 1.43 |
| HIPS | 0 | 51.26 | 2.03 |
| HIPS | 5 | 44.91 | 1.55 |
| HIPS | 10 | 34.02 | 0.83 |
| HIPS | 20 | 12.70 | 0.48 |

HDPE - Soltex T50-4400 from Solvey Corporation
HIPS - Novacor 3350 from Novacor Chemicals, Inc.

In Table 3, it is apparent that the polymer blends have suitable properties for structure elements of photographic materials. The compounds of materials further were tested to confirm that the molecular sieve properties of the materials were present after blending with the HIPS and HDPE polymer. The polymer zeolite blend maintains a substantial proportion of the zeolites absorptive properties.

The molecular sieve is found to maintain a large portion of its absorptive properties after formation into a polyethylene container such as used for storage of a film cartridge.

The invention has been described in detail with particular reference to preferred embodiments thereof, but it will be understood that variations and modifications can be effected within the spirit and scope of the invention.

We claim:

1. A method of improving the storage qualities of a film winder core comprising forming the entire core structure of said film winder core from a material that comprises a particulate molecular sieve material and polymer blend, and wherein said blend comprises about 2 to 40 percent by weight of said molecular sieve material.

2. The method of claim 1 wherein said film winder core is part of a film cartridge or film cassette.

3. The method of claim 1 wherein said molecular sieve comprises about 2 to 15 percent by weight of said blend.

TABLE 2

Effect of Molecular Sieve Additive On Mechanical Properties

| Base Resin | % Molecular Sieve Powder | C/H Speed (mm/min.) | Stress @ Yield (MPa) | Strain @ Yield (%) | Modulus (MPa) |
|---|---|---|---|---|---|
| HDPE | 0 | 50 | 23 | 9.96 | 847 |
| HDPE | 0 | 1 | 17 | 10.07 | 734 |
| HDPE | 5 | 50 | 21 | 8.70 | 871 |
| HDPE | 10 | 50 | 23 | 8.07 | 948 |
| HDPE | 10 | 20 | 19 | 7.76 | 932 |
| HDPE | 20 | 50 | 24 | 7.06 | 1,095 |
| HDPE | 20 | 20 | 20 | 8.15 | 1,076 |
| HDPE | 30 | 50 | 25 | 6.27 | 1,287 |
| HDPE | 30 | 10 | 21 | 6.87 | 1,290 |
| HIPS | 0 | 50 | 28 | 2.68 | 1,561 |
| HIPS | 0 | 10 | 25 | 2.57 | 1,519 |
| HIPS | 0 | 1 | 22 | 2.50 | 1,498 |
| HIPS | 5 | 10 | 22 | 2.10 | 1,667 |
| HIPS | 10 | 10 | 22 | 1.96 | 1,747 |
| HIPS | 20 | 10 | 22 | 1.83 | 2,021 |

HDPE - Soltex T50-4400 from Solvey Corporation
HIPS - Novacor 3350 from Novacor Chemicals, Inc.

4. A single use camera wherein the film winder core of said camera comprises a blend of polymer and a particulate sieve material, and wherein said blend comprises about 2 to 40 percent by weight of said molecular sieve material.

5. The camera of claim 4 wherein said blend comprises about 2 to about 15 percent by weight of said particulate molecular sieve material.

6. A method improving the storage qualities of a film cartridge or cassette comprising providing said cartridge or cassette wherein the core of said cartridge or cassette comprises a polymer and particles of a salt of calcium, magnesium, or aluminum.

7. The method of claim 6 wherein said salt comprises magnesium sulfate.

8. A camera wherein the structure of a film winder core in said camera comprises a blend of a polymer and particles of at least one of the salts of magnesium, calcium, or aluminum.

9. The method of improving the storage qualities of a film can comprising forming the lid of said film can from a material that comprises a particulate molecular sieve material and polymer blend, and wherein said blend comprises about 2 to 40 percent by weight of said molecular sieve material.

* * * * *